Patented Feb. 6, 1951

2,540,274

UNITED STATES PATENT OFFICE 2,540,274

AMINO ACID AMIDES OF PTEROIC ACID AND PROCESSES OF PREPARING THE SAME

James F. McPherson, Elizabeth, N. J., and Ralph Mozingo, Minneapolis, Minn., assignors to Merck & Co., Inc., Rahway, N. J., a corporation of New Jersey No Drawing. Application September 28, 1948, Serial No. 51,644

9 Claims. (Cl. 260—251.5)

This invention relates to chemical compounds having growth promoting action for certain organisms and to processes for preparing such compounds. More particularly, the invention relates to procedures by which substituted amides of p-[(2-amino-4-hydroxypyrimido [4,5-b]-pyrazine-6-ylmethyl)-amino]-benzoic acid can be prepared synthetically. Of the various amides that may be obtained, the most important appear to be those of the α-amino acids, and particularly of glutamic acid.

The glutamic acid amide, N-(p-[(2-amino-4-hydroxypyrimido [4,5-b]-pyrazine-6-ylmethyl)-amino]-benzoyl)-glutamic acid, is a pterin-like acidic chemical compound which is essential for the growth of Lactobacillus casei and also possesses hematopoietic activity for animals. Other α-amino acid amides also have growth promoting action and possess other important properties.

In a co-pending application of one of us, Mozingo, and our colleagues, Serial No. 739,248, filed April 3, 1947, processes for the preparation of N-(p-[(2-amino-4-hydroxypyrimido [4,5-b]-pyrazine-6-ylmethyl)-amino]-benzoyl)-glutamic acid, referred to therein as N-[4-([(2-amino-4-hydroxy-6-pteridyl)-methyl]-amino)-benzoyl]-glutamic acid, are disclosed wherein 4-([(2-acylamino-4-hydroxy-6-pteridyl)-methyl]-acylamino)benzoic acid, referred to herein as p-[(2-acylamino-4-hydroxypyrimido [4,5-b]-pyrazine-6-ylmethyl)-acylamino]-benzoic acid, is converted to the corresponding benzoyl halide, reacted with a glutamic acid ester in the presence of an alkaline condensing agent such as an alkali metal hydroxide, pyridine, or mixtures of both, and hydrolyzed to yield the desired compound.

It has now been discovered in accordance with the present invention that the above-reaction between a benzoyl halide and a glutamic acid ester, or other α-amino acid ester, can be carried out without the aid of an alkaline condensing agent, and that when the reaction takes place with both compounds in solution in a partially halogenated hydrocarbon, a substantial increase in yield of pure N-(p-[(2-amino-4-hydroxypyrimido [4,5-b]-pyrazine-6-ylmethyl)-amino]-benzoyl)-α-amino acid is obtained. In the case of the glutamic acid derivative, the increase in yield of pure product amounts to about 20–30%, and a pure product is more easily obtainable.

Accordingly, the process of this invention involves converting p-[(2-acylamino-4-hydroxypyrimido [4,5-b]-pyrazine-6-ylmethyl)-acylamino]-benzoic acid to the corresponding benzoyl halide, reacting said benzoyl halide with an α-amino acid ester while both compounds are in solution in a partially halogenated hydrocarbon, hydrolyzing the resulting compound, and recovering an N-(p-[(2-amino-4-hydroxypyrimido [4,5-b]-pyrazine-6-ylmethyl)-amino]-benzoyl)-α-amino acid. The reactions may be chemically represented, employing a glutamic acid ester as one of the starting materials, as follows:

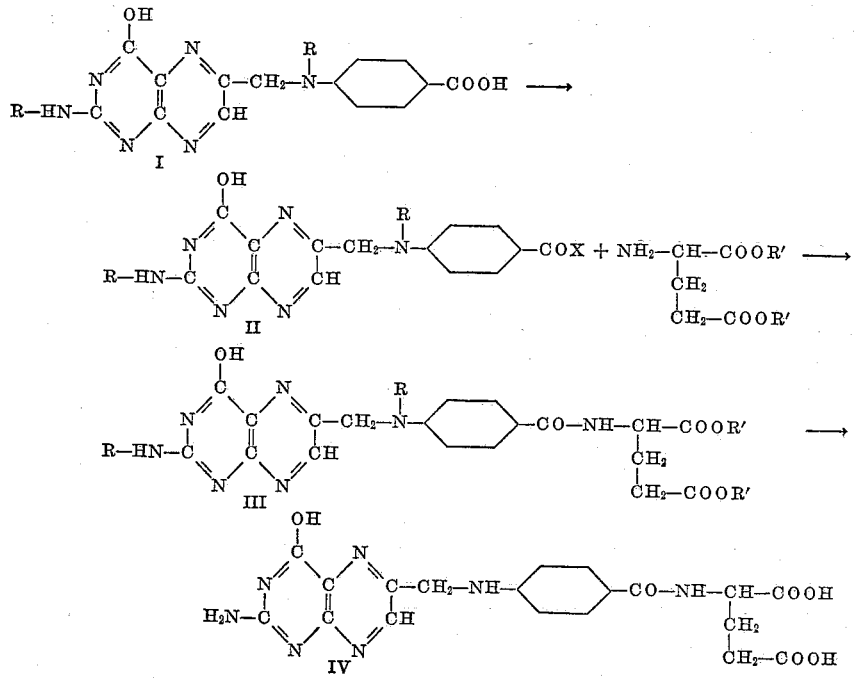

Wherein X represents a halogen, R represents an acyl group containing two or more carbon atoms, and R' represents an alkyl or aralkyl group.

In this process, we utilize as one of the starting materials p-[(2-acylamino-4-hydroxypyrimido [4,5-b]-pyrazine-6-ylmethyl)-acylamino]-benzoic acid (I). This compound may be obtained by acylating p-[(2-amino-4-hydroxy-pyrimido [4,5-b]-pyrazine-6-ylmethyl)-amino]-benzoic acid in accordance with the precedure described in a co-pending application of our colleagues, Wolf and Folkers, Serial No. 689,814, filed August 10, 1946, now Patent No. 2,515,813. We have found that the acyl group employed should contain two or more carbon atoms. Examples of acyl groups that can be used are acetyl, propionyl, butyryl, isobutyryl, valeryl, benzoyl, phenylacetyl, and the like.

The other starting material, namely an ester of an α-amino acid, may be either an alkyl or an aralkyl ester, and any one of the d, l, and dl forms may be employed. The amino acid may be any of the α-amino acids, such as arginine, lysine, proline, methionine, leucine, phenylalanine, valine, aspartic acid, alanine, and the like, including polypeptides such as glutamylglutamic acid, glutamylglutamylglutamic acid, glycylalanine, and the like.

In carrying out the process of the present invention, compound I is reacted with a thionyl halide by heating them together. Removal of the excess thionyl halide by evaporation leaves a residue containing p-[(2-acylamino-4-hydroxypyrimido [4,5-b]-pyrazine-6-ylmethyl)-acylamino]-benzoyl halide (II). This material may be used directly in the following reaction or may be further purified by repeated precipitation from chloroform solution with petroleum ether. We prefer to purify compound II in this manner before proceeding, as generally higher yields of purer product are then obtained.

We have found that the amino acid ester is most suitably reacted with compound II when both compounds are in solution in a partially halogenated hydrocarbon or mixtures of such hydrocarbons selected from the group consisting of chlorinated and brominated lower alkanes and lower alkenes containing one of the radicals

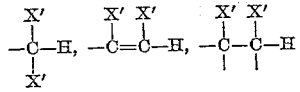

wherein X' represents a halogen selected from the group consisting of chlorine and bromine. The halogenated hydrocarbon employed should be a liquid at room temperature. Examples of suitable solvents are chloroform, bromoform, dichloromethane, dibromomethane, dichloroethane, dibromoethane, trichloroethane (1,1,2), trichloroethylene, trichlorodibromoethane (1,1,1;2,2), dibromopropane (1,1), dibromopropane (1,2), tribromobutane (1,2,3), and the like.

The amino acid ester is ordinarily obtained from its mineral acid salt in one of several ways. One method involves dissolving the acid salt in water, adding sodium bicarbonate to the solution, and extracting with the reaction solvent to be employed. An alternative method involves dissolving the acid salt in the reaction solvent containing the theoretical amount of pyridine required to neutralize the acid. This latter method is not preferred, inasmuch as the presence of pyridine in the following reaction mixture results in slightly lower yields.

The solution of amino acid ester dissolved in a halogenated hydrocarbon is added to the solid compound II to effect a reaction whereby an N-(p[(2-acylamino-4-hydroxypyrimido [4,5-b]-pyrazine-6-ylmethyl)-acylamino]-benzoyl)-amino acid ester (corresponding to compound III) is formed. The amino acid ester removes the hydrochloric acid formed in the reaction, and for that reason and to prevent further acylation of the amino acid ester, at least two molar equivalents of this ester are ordinarily employed with one molar equivalent of compound II. We prefer to use about three or four molar equivalents of ester per molar equivalent of compound II, for we find that the most favorable yields and quality are then obtained. The required amount of solvent is that necessary to effect solution of the reactants, and additional solvent can be used if desired. The reaction will take place from about 0° C. to about 100° C., or the boiling point of the solution when lower. We prefer to operate at about room temperature due to the simplicity of operation. Most of the reaction takes place in a relatively short time, but we prefer to allow the reaction mixture to stand about 12–24 hours to achieve more complete reaction. When the standing period is complete, the solvent is removed by evaporation, resulting in a residue containing a compound such as compound III.

This compound is then hydrolyzed by dissolving and heating in an aqueous medium containing slightly more than the theoretical amount of alkali metal hydroxide necessary to effect the desired hydrolysis, resulting in an N-(p-[(2-amino-4-hydroxypyrimido [4,5-b]-pyrazine-6-ylmethyl)-amino]-benzoyl)-amino acid (corresponding to compound IV). The reaction is preferably carried out at about the boiling point of the solution to effect the most rapid hydrolysis, though lower temperatures can be employed if desired. The hydrolysis period should be only that necessary to complete the desired hydrolysis, the preferential hydrolysis of the two original acylamino groups to amino groups and of the ester group or groups to an acid group or groups, for increasing this period may result in further hydrolysis or cleavage. When a compound corresponding to compound II is hydrolyzed with aqueous sodium hydroxide, the optimum hydrolysis period is about 3 hours at reflux temperature.

Acidification of the resulting solution to a pH of about 2–4 (i. e. to about the isoelectric point of the compound) results in the precipitation of the crude compound such as compound IV. Where further purification is desired, the precipitate is dissolved in a mineral acid and crystallized by adjusting the pH of the solution to 3–5. This procedure is repeated where higher purity is desired. We prefer to use an alkali metal salt of a weak acid, such as sodium acetate, to adjust the pH for the reason that better crystallization results than when a base such as an alkali metal hydroxide is used. Still higher purity and best crystals of the product are obtainable by recrystallizing from aqueous solution the material previously precipitated from acid solution.

The following examples illustrate methods of carrying out the present invention, but it is to be understood that these examples are given primarily by way of illustration and not of limitation.

Example 1

A mixture of 1 gram (0.0025 mole) of p-[(2- acetamino - 4 - hydroxypyrimido [4,5 - b] - pyrazine-6-ylmethyl)-acetamido]-benzoic acid and 25 milliliters of thionyl chloride was warmed on the steam bath for five minutes until a clear yellow-orange solution formed. The solvent was removed under reduced pressure to dryness yielding p-[(2-acetamido-4-hydroxypyrimido [4,5-b]-pyrazine-6-ylmethyl)-acetamido]-benzoyl chloride as a yellow-orange powder.

A chloroform solution of 1(+)glutamic acid diethyl ester was then prepared: 1.72 grams (0.0072 mole) of 1(+)glutamic acid diethyl ester hydrochloride was dissolved in 40 milliliters of water, 0.6 gram (0.0072 mole) of sodium bicarbonate was added, and the solution was extracted with four 40-milliliter portions of chloroform. The chloroform extracts were dried over anhydrous magnesium sulfate, filtered and concentrated under reduced pressure to a 30-milliliter volume.

The chloroform solution of 1(+)glutamic acid diethyl ester was added to the solid p-[(2-acetamido - 4 - hydroxypyrimido [4,5 - b] - pyrazine-6-ylmethyl)-acetamido]-benzoyl chloride with stirring. Sufficient chloroform was then added to the mixture to make the final volume about 50 milliliters. A yellow-orange solution developed at once. Stirring was continued for several hours and the solution was allowed to stand for four days at room temperature. The solvent was removed under reduced pressure leaving a fluffy solid containing N-(p-[(2-acetamido-4-hydroxypyrimido [4,5 - b] - pyrazine - 6 - ylmethyl)-acetamido]-benzoyl)-glutamic acid diethyl ester.

This fluffy solid was dissolved in 50 milliliters of N-sodium hydroxide and further evacuated to remove last traces of chloroform. The solution was heated at a bath temperature of 120° C. for three hours, cooled and diluted to 100-milliliter volume. After acidification to pH 2-3 with concentrated hydrochloric acid, the precipitate which formed was collected by centrifugation and was washed successively with water containing a little acetic acid, acetone and ether. A yellow-tan product was secured that weighed 0.94 gram and was about 60% N-(p-[(2-amino-4-hydroxypyrimido [4,5 - b] - pyrazine - 6- ylmethyl) - amino]-benzoyl)-glutamic acid, a yield of about 51% of theory.

Nine-tenths of a gram of the 0.94 gram obtained above was extracted with two 20-milliliter portions of 15% hydrochloric acid. A residue was left which weighed 0.25 grams. Dilution with water to a 400-milliliter volume of the 40-milliliter acid extract deposited a small amount of solid which was removed. To the yellow 400-milliliter volume was added sodium acetate to pH 3-4 until no more yellow-orange precipitate formed. This precipitate was collected by centrifugation and was washed with water containing a little acetic acid, and then with acetone and finally ether. There was secured 0.5 gram of a yellow-orange product which was essentially pure N-(p - [(2 - amino - 4 - hydroxy - pyrimido [4,5-b]-pyrazine - 6 - ylmethyl) - amino] - benzoyl) - glutamic acid as shown by comparison bioassays with natural N-(p-[(2-amino-4-hydroxypyrimido [4,5 - b] - pyrazine - 6-ylmethyl) - amino] - benzoyl)-glutamic acid, representing a yield of about 47% of theory.

*Example 2*

From 1 gram (0.0025 mole) of p-[(2-acetamido - 4 - hydroxypyrimido [4,5-b] - pyrazine-6-ylmethyl)-acetamido]-benzoic acid, yellow-orange p-[(2 - acetamido - 4 - hydroxypyrimido [4,5-b]-pyrazine-6-ylmethyl)-acetamido]-benzoyl chloride was prepared as in Example 1.

A chloroform solution of 1(+)glutamic acid diethyl ester was prepared by dissolving 5.7 grams (0.024 mole) of 1(+)glutamic acid diethyl ester hydrochloride in 50 milliliters of water, adding 2.0 grams (0.024 mole) of sodium bicarbonate to the solution and extracting with four 60-milliliter portions of chloroform. The chloroform solution was dried over anhydrous magnesium sulfate, filtered and concentrated under reduced pressure to a 50-milliliter volume.

The chloroform solution containing 1(+)glutamic acid diethyl ester was added to the solid p-[(2-acetamido-4-hydroxypyrimido [4,5-b]-pyrazine-6-ylmethyl) - acetamido]-benzoyl chloride with stirring and a yellow-orange solution immediately formed. After stirring the mixture for 20 hours, the solvent was removed in vacuo almost completely to leave a reddish gum that weighed about 6.0 grams and contained N-(p-[(2 - acetamido-4-hydroxypyrimido [4,5-b]-pyrazine - 6 - ylmethyl) - acetamido - benzoyl)-glutamic acid diethyl ester.

The reddish gum obtained above was dissolved in 50 milliliters of 1 N-sodium hydroxide and evacuated to remove the last of the chloroform. The solution was heated for three hours at a bath temperature of 120° C., cooled and diluted to 100 milliliters with water. Acidification of the solution to pH 2 with concentrated hydrochloric acid resulted in the formation of a precipitate which was collected and washed successively with water containing a small amount of acetic acid, acetone and ether. A product was secured that weighed 0.92 gram and was approximately 48% N-(p-[(2-amino-4-hydroxypyrimido [4,5-b]-pyrazine - 6 - ylmethyl) - amino]-benzoyl)-glutamic acid as shown by bioassay comparison with natural N-(p-[(2-amino - 4 - hydroxypyrimido [4,5-b] - pyrazine-6-ylmethyl)-amino]-benzoyl)-glutamic acid, a yield of about 40% of theory.

Purification of the crude product by the extraction procedure in Example 1 gave a total of 0.59 gram of about 60% N-(p-[(2-amino-4-hydroxypyrimido [4,5-b]-pyrazine - 6 - ylmethyl) - amino]-benzoyl)-glutamic acid, a yield of about 32% of theory. The ultraviolet absorption spectrum of this compound in pH 10.81 solution showed characteristic maxima at 3675 Å., $E_{1\%}^{1cm.}$ 198; 2825 Å., $E_{1\%}^{1cm.}$ 540;

2550 Å., $E_{1\%}^{1cm.}$ 538

*Example 3*

From 1 gram (0.0025 mole) of p-[(2-acetamido-4-hydroxypyrimido [4,5-b] - pyrazine-6-ylmethyl)-acetamido]-benzoic acid, yellow-orange p-[(2-acetamido - 4 - hydroxypyrimido [4,5-b]-pyrazine-6-ylmethyl)-acetamido] - benzoyl chloride was prepared as in Example 1.

A chloroform solution of 1(+) glutamic acid diethyl ester was prepared by dissolving 1.72 grams (0.0072 mole) of 1(+)glutamic acid diethyl ester hydrochloride and 1.0 milliliter of pyridine in 50 milliliters of chloroform.

The chloroform solution of 1(+)glutamic acid diethyl ester was added with stirring to the p-[(2 - acetamido-4-hydroxypyrimido [4,5-b]-pyrazine-6-ylmethyl)-acetamido] - benzoyl chloride. A yellow-orange solution immediately formed with a slight evolution of heat. The mixture was stirred continuously for four hours and the clear solution was then allowed to stand overnight at room temperature. The chloroform and some pyridine were removed under reduced pressure leaving about 4.0 grams of a reddish gum containing N-(p-[(2-acetamido-4-hydroxypyrimido [4,5-b]-pyrazine - 6 - ylmethyl) -acetamido]-benzoyl)-glutamic acid diethyl ester.

The reddish gum was dissolved in 50 milliliters of 1 N sodium hydroxide and evacuated on the water pump to remove the last of the chloroform. The solution was heated for three hours at a bath temperature of 120° C. and diluted with water to a volume of 100 milliliters. Upon acidification of the solution to pH 2 with concentrated hydrochloric acid, a reddish-orange precipitate separated from solution. This precipitate was collected by centrifugation and was washed successively with water containing a small quantity of acetic acid, acetone and ether. A yellow-tan product weighing about 1.0 gram and containing approximately 40% N-(p-[(2-amino-4-hydroxy-pyrimido [4,5-b]-pyrazine-6-ylmethyl) -amino]-benzoyl) -glutamic acid was obtained as shown by comparison bioassays with natural N-(p-[(2-amino-4-hydroxy-pyrimido [4,5-b]-pyrazine - 6-ylmethyl) - amino] - benzoyl) - glutamic acid, a yield of about 36% of theory.

Purification of the crude product by the procedure of Example 1 gave a product of about 56% N-(p-[(2-amino-4-hydroxypyrimido [4,5-b]-pyrazine - 6 - ylmethyl) -amino]-benzoyl) - glutamic acid which had the following characteristic ultraviolet absorption spectrum in pH 10.81 solution:

Maxima at 3675 Å., $E_{1\%}^{1 cm.}$ 206;

2825 Å., $E_{1\%}^{1 cm.}$ 526; 2575 Å., $E_{1\%}^{1 cm.}$ 364

A second precipitation from a hydrochloric acid solution followed by crystallization from hot water gave a product containing about 70% N-(p-[(2-amino - 4 - hydroxypyrimido [4,5-b]-pyrazine - 6 - ylmethyl) - amino]-benzoyl) -glutamic acid.

*Example 4*

A mixture of 0.5 gram of p-[(2-acetamido-4-hydroxypyrimido [4,5-b]-pyrazine-6-ylmethyl) -acetamido]-benzoic acid and 15 milliliters of thionyl chloride was warmed on a steam bath for about five minutes until a yellow-orange solution formed. The solvent was removed under reduced pressure, leaving a yellow-orange powder.

The yellow-orange powder was dissolved in 30 milliliters of chloroform, filtered and diluted to 125-milliliter volume with petroleum ether (30–60°). The tan precipitate that formed was collected by centrifugation and was washed once with petroleum ether. After partial drying, the precipitation and filtration procedure was repeated to make a total of four times. The very light tan material, still moist with petroleum ether, was evacuated in a desiccator over sodium hydroxide. There was secured 0.41 gram of p-[(2-acetamido-4-hydroxypyrimido [4,5-b]-pyrazine-6-ylmethyl) -acetamido]-benzoyl chloride. A 20-milligram sample was evacuated on the oil pump for micro-analysis.

*Analysis.*—Calculated for $C_{18}H_{15}N_6O_4Cl$: C, 52.12; H, 3.65; Cl, 8.55. Found: C, 50.97, 50.76; H, 3.68, 3.80; Cl, 8.76.

To 0.47 gram of p-[(2-acetamido-4-hydroxypyrimido [4,5-b] - pyrazine - 6 - ylmethyl) - acetamido]-benzoyl chloride precipitated several times from chloroform solution with petroleum ether was added a 50-milliliter chloroform solution containing about three equivalents of 1(+)glutamic acid diethyl ester. The clear yellow-orange reaction mixture was stirred for four hours and then allowed to stand overnight. (The solution of ester was prepared as follows: To 0.86 gram (0.0036 mole) of 1(+)glutamic acid diethyl ester hydrochloride in 30-milliliters of water was added 0.3 gram (0.0036 mole) of sodium bicarbonate. This solution was extracted with five 25-milliliter portions of chloroform; the extracts were dried over anhydrous magnesium sulfate and then filtered. The chloroform was concentrated under reduced pressure to a 30-milliliter volume.)

The chloroform was removed from the reaction mixture under reduced pressure. The residue was dissolved in 25 milliliters of 1 N sodium hydroxide and evacuated to remove the last of the chloroform. The solution was heated for three hours in an oil bath at 120° C., cooled and diluted with water to a 75-milliliter volume. After acidification to pH 2–3 with concentrated hydrochloric acid, the precipitate was collected by centrifugation and was washed with water containing a little acetic acid, then with acetone and finally ether. There was secured 0.42 gram of a yellow-orange product, which was about 70% N - (p - [(2 - amino - 4 - hydroxypyrimido [4,5 - b] - pyrazine - 6 - ylmethyl) - amino] - benzoyl)-glutamic acid by comparison bioassay with natural N - (p - [ ( 2 - amino - 4 - hydroxypyrimido [4,5 - b] - pyrazine - 6 - ylmethyl) - amino] - benzoyl) - glutamic acid, a yield of about 60% of theory.

Of this crude product, 0.39 gram was extracted with two 10-milliliter portions of 15% hydrochloric acid. The residue was washed as above and dried. There was secured 0.070 gram of residue. The extracts were diluted to a 200-milliliter volume. The precipitate which formed was collected, washed and dried as above; weight 0.030 gram. To the 200-milliliter volume was added sodium acetate until no more precipitate formed. This yellow-orange precipitate was collected by centrifugation and was washed with water containing a little acetic acid, then acetone and finally ether. This product, weighing 0.23 gram, was essentially pure N-(p-[(2-amino-4-hydroxypyrimido [4,5-b]-pyrazine-6-ylmethyl) -amino]-benzoyl) -glutamic acid, representing a yield of about 50% of theory.

*Example 5*

The preparation starting with 1.0 gram of p-[(2 - acetamido - 4 - hydroxypyrimido [4,5-b]-pyrazine - 6 - ylmethyl) - acetamido] - benzoic acid was repeated as in Example 3 with the difference that ethylene dichloride containing 1.0 milliliter of pyridine was used as the reaction medium. The product weighed 1.04 grams and was approximately 40% N - (p - [(2 - amino - 4 - hydroxypyrimido [4,5-b]-pyrazine-6-ylmethyl) -amino]-benzoyl) -glutamic acid by comparison bioassays with natural N - (p - [(2 - amino - 4 - hydroxypyrimido [4,5-b]-pyrazine-6-ylmethyl) -amino]-benzoyl) -glutamic acid, a yield of about 38% of theory.

Purification of the crude product by the method of Example 1 gave a product of about 50 to 60% N - (p - [(2 - amino - 4 - hydroxypyrimido [4,5 - b] - pyrazine - 6 - ylmethyl) - amino]-benzoyl-glutamic acid by comparison bioassays with natural N -(p - [(2 - amino - 4 - hydroxypyrimido [4,5 - b] - pyrazine - 6 - ylmethyl) - amino]-benzoyl)-glutamic acid.

Example 6

Two grams (0.005 mole) of p-[(2-acetamido-4-hydroxypyrimido [4,5-b]-pyrazine-6-ylmethyl)-acetamido]-benzoic acid in 40 milliliters of thionyl chloride was warmed on the steam bath until a clear solution resulted. This solution was concentrated on the water pump to leave a yellow-orange residue which was evacuated for a short time. To this was added dl-methionine ethyl ester in about 100 milliliters of chloroform. The clear reddish-orange solution which resulted was let stand at room temperature for three days.

[The ester solution was prepared as follows: 4.27 grams (0.020 mole) of dl-methionine ethyl ester hydrochloride was dissolved in 20 milliliters of water. To this was added 1.68 grams (0.020 mole) of sodium bicarbonate in 10 milliliters of water. This solution was extracted with six 20-milliliter portions of chloroform. After drying over anhydrous magnesium sulfate, the chloroform solution was concentrated under reduced pressure to about 100-milliliter volume.]

The chloroform solution was concentrated under reduced pressure to leave a gummy residue. This was dissolved in 100 milliliters of 1 N sodium hydroxide and heated at a bath temperature of about 120° for three hours. At the beginning of the heating, the condenser was removed for a time so any chloroform could escape. After cooling, the solution was acidified to pH 2 with concentrated hydrochloric acid. The yellow-orange precipitate was collected by centrifugation and was washed five times with water containing a little acetic acid.

The yellow-orange precipitate was extracted with 10-milliliter portions of 15% hydrochloric acid and the filtered extracts were precipitated using filtered saturated sodium acetate solution. The yellow-orange precipitate was collected by centrifugation and was washed with water containing a little acetic acid. This procedure was performed three times. The final precipitate was washed with water containing a small amount of acetic acid until the washes were chloride free and dried in vacuo over potassium hydroxide. There was secured 1.6 grams of yellow-orange N - (p - [(2 - amino-4-hydroxypyrimido [4,5-b]-pyrazine - 6 - ylmethyl) - amino] - benzoyl)-dl-methionine, essentially pure, a yield of 72% of theory.

*Analysis.*—Calculated for $C_{19}H_{21}O_4N_7S$: C, 51.46; H, 4.77; N, 22.11. Found: C, 51.73; H, 4.95; N, 21.94.

Example 7

Two grams (0.005 mole) of p-[(2-acetamido-4-hydroxypyrimido [4,5-b]-pyrazine-6-ylmethyl)-acetamido]-benzoic acid was converted to the chloride as in Example 6. l-Leucine ethyl ester hydrochloride (3.91 grams) (0.020 mole) was converted to l-leucine ethyl ester dissolved in 100 milliliters of chloroform by the method of Example 6. The chloroform solution was added to the solid acid chloride. The clear orange-red colored solution which formed was let stand at room temperature overnight.

The reaction mixture was worked up as in Example 6. The clear yellow-orange product was purified by the extraction procedure of Example 6. There was secured 1.43 grams of yellow-orange N-(p-[2-amino-4-hydroxypyrimido [4,5-b] - pyrazine - 6-ylmethyl)-amino]-benzoyl)-l-leucine, essentially pure, a yield of 67% of theory.

*Analysis.*—Calculated for $C_{20}H_{23}O_4N_7$: C, 56.46; H, 5.45; N, 23.05. Found: C, 56.42; H, 5.62; N, 23.33.

Example 8

Two grams (0.005 mole) of p-[(2-acetamido-4-hydroxypyrimido [4,5-b]-pyrazine-6-ylmethyl)-acetamido]-benzoic acid was converted to the chloride as in Example 6. dl-Phenylalanine ethyl ester hydrochloride (4.39 grams) (0.020 mole) was converted to dl-phenylalanine ethyl ester dissolved in about 100 milliliters of chloroform by the method of Example 6. The chloroform solution was added to solid acid chloride. The clear orange-red colored solution which formed was let stand overnight at room temperature.

The reaction mixture was worked up as in Example 6. The crude yellow-orange product was purified by the extraction method of Example 6. There was secured 1.35 grams of yellow-orange N - (p - [(2 - amino-4-hydroxypyrimido [4,5-b]-pyrazine - 6 - ylmethyl) - amino] - benzoyl)-dl-phenylalanine, essentially pure, a yield of 58% of theory.

*Analysis.*—Calculated for $C_{23}H_{21}O_4N_7$: C, 60.12; H, 4.61; N, 21.34. Found: C, 60.39; H, 4.85; N, 20.82; N, 20.67

Example 9

Two grams (0.005 mole) of p-[(2-acetamido-4-hydroxypyrimido [4,5-b]-pyrazine-6-ylmethyl)-acetamido]-benzoic acid was converted to the chloride as in Example 6. dl-Valine ethyl ester hydrochloride (3.61 grams) (0.020 mole) was converted to dl-valine ethyl ester dissolved in 100 milliliters of chloroform by the method of Example 6. The chloroform solution was added to the solid acid chloride. The clear reddish-orange solution which formed was let stand overnight at room temperature.

The reaction mixture was worked up as in Example 6. The crude yellow-orange product was purified by the extraction method of Example 6. There was secured 1.41 grams of yellow-orange N-(p-[(2-amino - 4 - hydroxypyrimido [4,5-b]-pyrazine-6-ylmethyl)-amino]-benzoyl)-dl - val - ine, essentially pure, a yield of 68% of theory.

*Analysis.*—Calculated for $C_{19}H_{21}O_4N_7$: C, 55.47; H, 5.15; N, 23.83. Found: C, 56.09; H, 5.41; N, 23.57.

Example 10

Two grams (0.005 mole) of p-[(2-acetamido-4-hydroxypyrimido [4,5-b]-pyrazine-6 - ylmethyl)-acetamido]-benzoic acid was converted to the chloride as in Example 6. dl-Aspartic acid diethylester hydrochloride (4.51 grams) (0.020 mole) was converted to dl-aspartic acid diethyl ester dissolved in about 100 milliliters of chloroform by the method of Example 6. The chloroform solution was added to the solid acid chloride. The clear reddish solution which formed was let stand at 25° for eighteen hours.

The reaction mixture was worked up as in Example 6. The crude tan-yellow product was purified by the extraction procedure of Example 6. There was secured 1.24 grams of tan-yellow N-(p-[(2 - amino - 4 - hydroxypyrimido [4,5-b]-pyrazine-6-ylmethyl)-amino]-benzoyl) - dl - aspartic acid, essentially pure, a yield of 58% of theory.

*Analysis.*—Calculated for $C_{18}H_{17}O_6N_7$: C, 50.58; H, 4.01; N, 22.94. Found: C, 50.40; H, 4.36; N, 23.56.

Example 11

Two grams (0.005 mole) of p-[(2-acetamido-4-hydroxypyrimido [4,5-b]-pyrazine-6 - ylmethyl)-acetamido]-benzoic acid was converted to the chloride as in Example 6. dl-Alanine ethyl ester hydrochloride (3.07 grams) (0.020 mole) was converted to dl-alanine ethyl ester dissolved in about 100 milliliters of chloroform by the method of Example 6. The chloroform solution was added to the solid acid chloride. The clear reddish-orange solution which formed was let stand at 25° for 48 hours.

The reaction mixture was worked up as in Example 6. The crude yellow product was purified by the extraction procedure of Example 6. There was secured 1.30 grams of yellow N-(p-[(2-amino-4-hydroxypyrimido [4,5-b]-pyrazine-6-ylmethyl)-amino]-benzoyl)-dl-alanine, essentially pure, a yield of 67% of theory.

*Analysis.*—Calculated for $C_{17}H_{17}O_4N_7$: C, 53.26; H, 4.47; N, 25.58. Found: C, 53.20; H, 4.63; N, 25.41.

*Example 12*

A mixture of 0.610 grams (0.00152 mole) of p-[(2-acetamido-4-hydroxypyrimido [4,5-b]-pyrazine-6-ylmethyl)-acetamido]-benzoic acid and 20 milliliters of thionyl chloride was heated at reflux for five minutes. The resulting clear solution was evaporated to dryness under reduced pressure yielding p-[(2-acetamido-4-hydroxypyrimido [4,5-b]-pyrazine-6-ylmethyl)-acetamido]-benzoyl chloride as a yellow-orange powder.

To the powder was added 0.523 gram (0.00165 mole) of glutamylglutamic acid trimethyl ester in 50 milliliters of chloroform. The solution was allowed to stand for eighteen hours at room temperature. A small amount of dark brown precipitate was then removed by centrifugation; and the solvent was removed under reduced pressure, leaving a residue containing N-(p-[(2-acetamido-4-hydroxypyrimido [4,5-b]-pyrazine-6-ylmethyl)-acetamido]-benzoyl)-glutamylglutamic acid trimethyl ester.

The residue was washed successively with 100 milliliters of ethyl ether, 15 milliliters of 15% hydrochloric acid, and water until the pH of the wash was 6–7. After drying, the residue weighed 0.417 gram.

The residue was then dissolved in 15 milliliters of N-sodium hydroxide and refluxed in a nitrogen atmosphere for one and one-half hours. The solution was adjusted to pH 3–4 with dilute hydrochloric acid, and a precipitate of crude N-(p-[(2-amino-4-hydroxypyrimido [4,5-b]-pyrazine-6-ylmethyl)-amino]-benzoyl)-glutamylglutamic acid formed.

The crude precipitate was dissolved in 15% hydrochloric acid and diluted with water. Sodium acetate was added to pH 5 until no more precipitate formed. After four such reprecipitations, washing with water, and drying, the product was assayed for *L. casei* activity and S. L. R. activity. The assay value showed 2030 units per milligram for *L. casei* and 330 units per milligram for S. L. R.

*Analysis.*—Calculated for $C_{24}H_{26}N_8O_9$: C, 50.52; H, 4.59; N, 19.65. Found: C, 49.28; H, 4.29; N, 18.40.

N-(p-[(2-amino-4-hydroxypyrimido [4,5-b]-pyrazine-6-ylmethyl)-amino]-benzoyl)-glutamylglutamylglutamic acid, assaying 1000 units per milligram for *L. casei* and 233 units per milligram for S. L. R., could be prepared in the same manner, employing glutamylglutamylglutamic acid tetramethyl ester as a starting material. The ultra-violet absorption spectrum of this product in pH 11 solution shows maxima at 2550 Å., $E_{1\%}^{1 cm.}$ 353; 2800 Å., $E_{1\%}^{1 cm.}$ 326;

3650 Å., $E_{1\%}^{1 cm.}$ 139

Modifications may be made in carrying out the present invention without departing from the spirit and scope thereof and the invention is to be limited only by the appended claims.

We claim:

1. The process that comprises reacting a compound having the general formula:

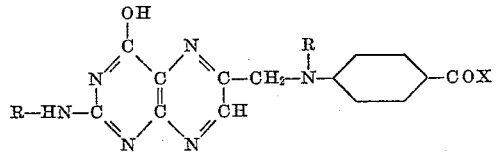

wherein X represents a halogen and R represents an acyl group containing two or more carbon atoms, with a completely esterified α-amino-acid ester selected from the group consisting of alkyl and aralkyl esters of the α-amino acids in the presence of a partially halogenated hydrocarbon selected from the group consisting of chlorinated and brominated lower alkanes and lower alkenes containing one of the radicals:

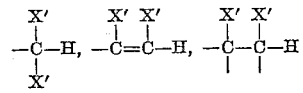

wherein X' represents the halogen substituent, hydrolyzing the N-(p-[(2-acylamino-4-hydroxypyrimido[4,5-b]-pyrazine-6-ylmethyl)-acylamino]-benzoyl)-α-amino acid ester thus formed, and recovering an N-(p-[(2-amino-4-hydroxypyrimido[4,5-b]-pyrazine-6-ylmethyl)-amino]-benzoyl-α-amino acid.

2. The process that comprises reacting a compound having the general formula:

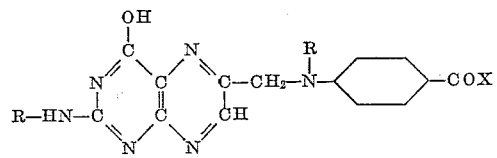

wherein X represents a halogen and R represents an acyl group containing two or more carbon atoms, with a completely esterified α-amino acid ester selected from the group consisting of alkyl and aralkyl esters of the α-amino acids in the presence of chloroform, hydrolyzing the N-(p-[(2-acylamino-4-hydroxypyrimido [4,5-b]-pyrazine-6-ylmethyl)-acylamino]-benzoyl)-α-amino acid ester thus formed, and recovering an N-(p-[(2-amino-4-hydroxypyrimido [4,5-b]-pyrazine-6-ylmethyl)-amino]-benzoyl)-α-amino acid.

3. The process that comprises reacting p-[(2-acetamido-4-hydroxypyrimido [4,5-b]-pyrazine-6-ylmethyl)-acetamido]-benzoyl chloride with a completely esterified α-amino acid alkyl ester in the presence of chloroform, hydrolyzing the N-(p-[(2-acetamido-4-hydroxypyrimido [4,5-b]-pyrazine-6-ylmethyl)-acetamido]-benzoyl)-α-amino acid alkyl ester thus formed, and recovering an N-(p-[(2-amino-4-hydroxy-pyrimido [4,5-b]-pyrazine-6-ylmethyl)-amino]-benzoyl)-α-amino acid.

4. The process that comprises reacting p-[(2-acetamido-4-hydroxypyrimido [4,5-b]-pyrazine-6-ylmethyl)-acetamido]-benzoyl chloride with glutamic acid dialkyl ester in the presence of chloroform, hydrolyzing the N-(p-[(2-acetamido-4-hydroxypyrimido [4,5-b]-pyrazine-6-ylmethyl)-acetamido]-benzoyl)-glutamic acid dialkyl ester thus formed, and recovering N-(p-[(2-amino-4-hydroxypyrimido [4,5-b]-pyrazine-6-ylmethyl)-amino]-benzoyl)-glumatic acid.

5. The process that comprises reacting p-[(2-acetamido-4-hydroxypyrimido [4,5-b]-pyrazine-6-ylmethyl)-acetamido]-benzoyl chloride with glutamylglutamic acid trialkyl ester in the presence of chloroform, hydrolyzing the N-(p-[(2-acetamido-4-hydroxypyrimido [4,5-b]-pyrazine-6-ylmethyl)-acetamido]-benzoyl)-glutamylglutamic acid trialkyl ester thus formed, and recovering N-(p-[(2-amino-4-hydroxypyrimido [4,5-b]-pyrazine-6-ylmethyl)-amino]-benzoyl)-glutamylglutamic acid.

6. The process that comprises reacting p-[(2-acetamido-4-hydroxypyrimido [4,5-b]-pyrazine-6-ylmethyl)-acetamido]-benzoyl chloride with glutamylglutamylglutamic acid tetraalkyl ester in the presence of chloroform, hydrolyzing the N-(p-[(2-acetamido-4-hydroxypyrimido [4,5-b]-pyrazine-6-ylmethyl)-acetamido]-benzoyl)-glutamylglutamylglutamic acid tetraalkyl ester thus formed, and recovering N-(p-[(2-amino-4-hydroxypyrimido [4,5-b]-pyrazine-6-ylmethyl)-amino]-benzoyl)-glutamylglutamylglutamic acid.

7. The process in accordance with claim 6 in which at least two molar equivalents of glutamic acid dialkyl ester are employed with one molar equivalent of p-[(2-acetamido-4-hydroxypyrimido [4,5-b]-pyrazine-6-ylmethyl)-acetamido]-benzoyl chloride.

8. N-(p-[(2-amino-4-hydroxypyrimido [4,5-b]-pyrazine-6-ylmethyl)-amino]-benzoyl)-methionine.

9. N-(p-[(2-amino-4-hydroxypyrimido [4,5-b]-pyrazine-6-ylmethyl)-amino]-benzoyl)-phenylalanine.

JAMES F. McPHERSON.
RALPH MOZINGO.

REFERENCES CITED

The following references are of record in the file of this patent:

UNITED STATES PATENTS

| Number | Name | Date |
|---|---|---|
| 2,442,836 | Angier | June 8, 1948 |

OTHER REFERENCES

Aberholden et al.: Chemical Abstracts, 20, 1994[4,5] (1926).

Fieser and Fieser; "Organic Chemistry," pp. 235–236, 185–186, 608, 1944 edition, D. C. Heath and Co.

Wolf et al.: J. Am. Chem. Soc., 69, 2753–2759 (1947).